United States Patent
Addis

(10) Patent No.: US 8,727,354 B2
(45) Date of Patent: May 20, 2014

(54) BRUSH SEAL ASSEMBLY AND METHOD OF MANUFACTURING SAME

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 1001 days.

(21) Appl. No.: 12/014,283

(22) Filed: Jan. 15, 2008

(65) Prior Publication Data

US 2009/0179384 A1 Jul. 16, 2009

(51) Int. Cl.
*F01D 11/02* (2006.01)
*F16J 15/44* (2006.01)
*B23P 19/02* (2006.01)

(52) U.S. Cl.
USPC .......................................... 277/355; 277/412

(58) Field of Classification Search
USPC .................................. 277/355, 412
See application file for complete search history.

(56) References Cited

U.S. PATENT DOCUMENTS

| | | | |
|---|---|---|---|
| 5,474,305 A * | 12/1995 | Flower | 277/355 |
| 5,944,321 A | 8/1999 | Niebling et al. | |
| 6,109,663 A | 8/2000 | Hayton | |
| 6,254,344 B1 | 7/2001 | Wright et al. | |
| 6,331,006 B1 * | 12/2001 | Baily et al. | 277/355 |
| 6,565,094 B2 | 5/2003 | Wright et al. | |
| 6,880,829 B1 * | 4/2005 | Datta | 277/350 |
| 6,918,739 B2 * | 7/2005 | Addis | 415/1 |
| 7,000,923 B2 | 2/2006 | Addis | |
| 7,048,496 B2 | 5/2006 | Proctor et al. | |
| 7,226,054 B2 | 6/2007 | Addis | |
| 7,565,729 B2 * | 7/2009 | Adis et al. | 29/505 |
| 2003/0178778 A1 * | 9/2003 | Szymbor et al. | 277/355 |
| 2004/0126222 A1 | 7/2004 | Addis | |
| 2006/0091611 A1 | 5/2006 | Addis | |
| 2006/0210392 A1 | 9/2006 | Enderby | |

FOREIGN PATENT DOCUMENTS

| | | |
|---|---|---|
| EP | 1 347 218 | 9/2003 |
| EP | 1 655 526 | 5/2006 |
| EP | 1 930 634 | 6/2008 |
| GB | 2 191 825 | 12/1987 |

OTHER PUBLICATIONS

European Search Report for EP Application No. 09250080.0, May 25, 2009.

* cited by examiner

*Primary Examiner* — Shane Bomar
*Assistant Examiner* — Robert E Fuller
(74) *Attorney, Agent, or Firm* — Carlson, Gaskey & Olds, P.C.

(57) ABSTRACT

A brush seal assembly is disclosed that includes bristles arranged circumferentially about an axis to provide a bristle assembly. First and second plates are secured about the bristle assembly to provide a subassembly. A circumference of the subassembly is pressed into a retaining ring to provide the brush seal assembly. The circumference need not be machined. A perimeter weld is no longer needed to secure the first and second plates and bristle assembly to one another to provide the brush seal assembly.

1 Claim, 2 Drawing Sheets

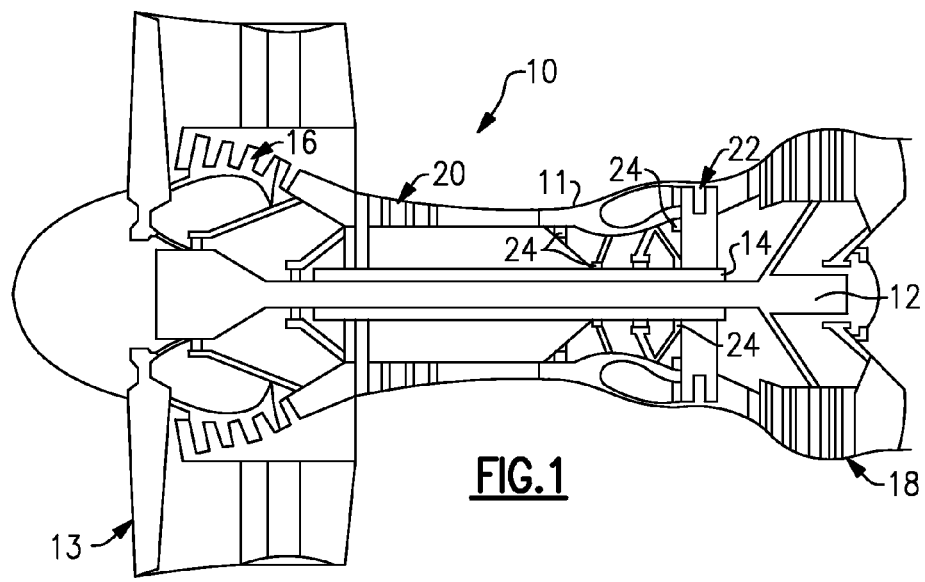
FIG.1
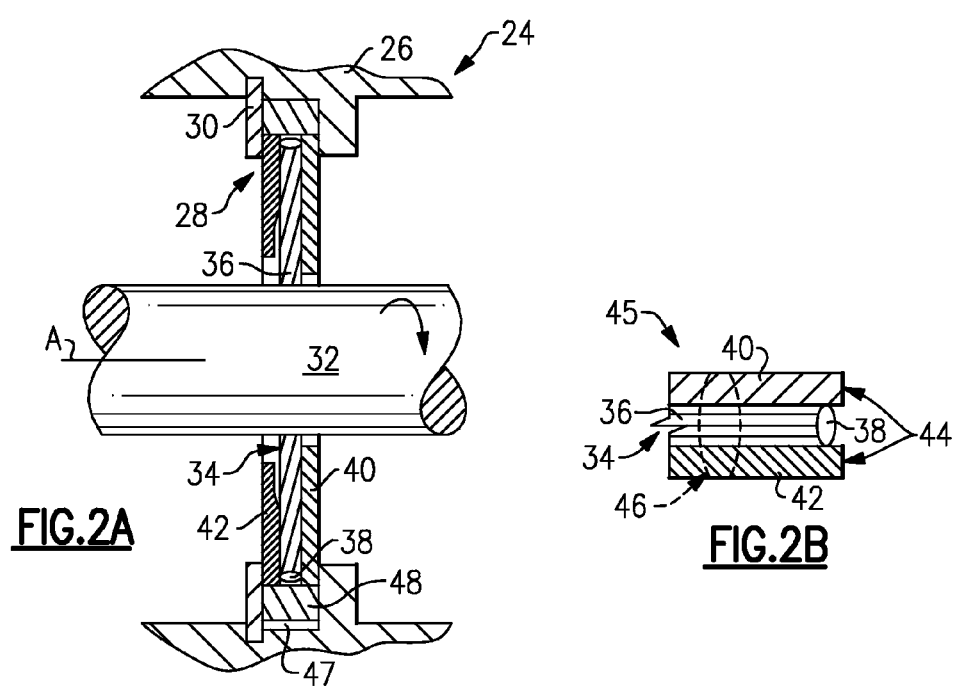
FIG.2A
FIG.2B

BRUSH SEAL ASSEMBLY AND METHOD OF MANUFACTURING SAME

BACKGROUND

This disclosure relates to brush seals that are used in, for example, turbine engines. The disclosure also relates to a method of manufacturing a brush seal assembly.

A typical brush seal assembly includes one or more subassemblies having bristles that seal against a rotating surface of a shaft, for example. Each subassembly includes bristles arranged circumferentially about an axis. The bristles are secured to one another by a perimeter weld bead that joins the outer ends of the bristles to one another to provide a bristle hoop. The weld bead is machined during a typical manufacturing process, for example, by using a laser.

A plate is arranged on either side of the bristle assembly to provide the subassembly. Another weld bead secures the first and second plates to the bristle assembly at the outer circumference of the subassembly. Typically, the subassembly is heat-treated to counteract the negative effects of the heat affected zone created by the perimeter weld bead. This subassembly is machined at the weld bead to provide the desired final dimensions at the outer circumference. The fixtures associated with the bristle hoop and subassembly machining are costly.

The current brush seal assembly and manufacturing process is costly due to the required machining of multiple perimeter welds beads. What is needed is a more cost effective brush seal assembly and manufacturing process.

SUMMARY

A brush seal assembly is disclosed that includes bristles arranged circumferentially about an axis to provide a bristle assembly. First and second plates are secured about the bristle assembly to provide a subassembly. A circumference of the subassembly is pressed into a retaining ring to provide the brush seal assembly. The circumference need not be machined. A perimeter weld is no longer needed to secure the first and second plates and bristle assembly to one another to provide the brush seal assembly.

These and other features of the disclosure can be best understood from the following specification and drawings, the following of which is a brief description.

BRIEF DESCRIPTION OF THE DRAWINGS

FIG. 1 is a highly schematic view of an example gas turbine engine.

FIG. 2A is a cross-sectional view of a brush seal assembly arranged about a rotating member.

FIG. 2B is an enlarged cross-sectional view of a portion of a brush seal subassembly.

DETAILED DESCRIPTION

Figure 3:
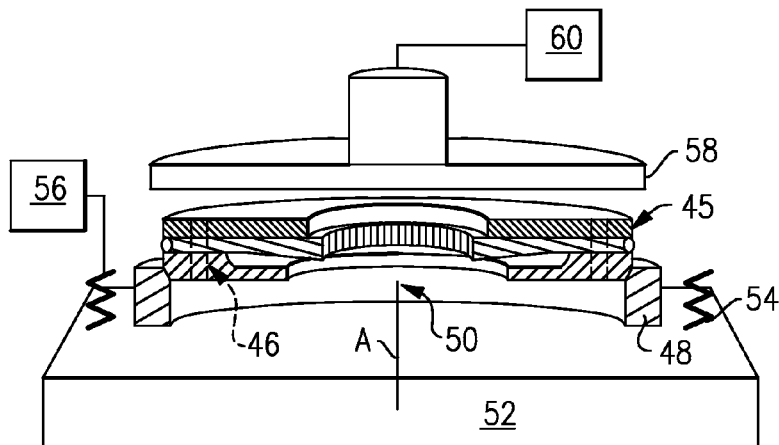
FIG. 3 is a schematic view of the brush seal subassembly prior to being pressed into a retaining ring.

A gas turbine engine 10 is schematically shown in FIG. 1. The engine 10 includes a low spool 12 and a high spool 14 coaxial with one another for rotation about a common axis. A low pressure compressor 16 and low pressure turbine 18 are mounted on the low spool 12. A high pressure compressor section 20 and a high pressure turbine section 22 are mounted on the high spool 14. A fan 13 is coupled to the low spool 12. The spools 12, 14 and compressor and turbine sections 16, 18, 20 and 22 are mounted within a case 11. Various rotating structures are sealed relative to the case 11 with seals 24. One such commonly used seal is a brush seal.

Referring to FIG. 2A, a brush seal assembly 28 is housed within a carrier 26 and retained relative thereto by a retainer 30 and a shoulder of the carrier. The brush seal assembly 28 seals against a rotating member 32. The brush seal assembly 28 includes a bristle assembly 34 that includes bristles 36 circumferentially arranged about an axis A.

A perimeter weld bead 38 secures outer ends of the bristles 36 to one another such that the bristles 36 form a unitary structure. Typically, this weld bead 38 has been machined prior to assembling the brush seal assembly 28 in prior art manufacturing processes. Referring to FIGS. 2A and 2B, first and second plates 40, 42 are secured about the bristle assembly 34 to provide the brush seal assembly 28. In the example shown, the perimeter weld bead 38 is arranged radially inwardly of the outer periphery 44 of the first and second plates 40, 42. As a result, the perimeter weld bead 38 need not be machined.

The first and second plates 40, 42 and bristle assembly 34 are secured to one another by tack welds 46, which are schematically depicted in the Figures. The tack welds 46 maintain the first and second plates 40, 42 and the bristle assembly 34 in a desired alignment with one another. Typically, an additional weld is used to secure the bristle assembly 34 to the first and second plates 40, 42 at the outer periphery 44 and the perimeter weld bead 38. This weld would then be machined in the prior art to provide desired final dimensions. The example brush seal assembly 28 eliminates the weld at the outer periphery 44, and the machining of that weld and of the perimeter weld bead 38. Instead, the example brush seal assembly 28 utilizes a retaining ring 48 to secure the first and second plates 40, 42 and bristle assembly 34 securely to one another. The retaining ring 48 includes an outer diameter that engages an inner diameter of the carrier 26. In the prior art, the machined outer periphery 44 would engage the inner diameter of the carrier 26. The retaining ring 48 includes an anti-rotation feature 47 at its outer diameter in the example shown, which is received by a complimentary feature in the carrier 26, best shown in FIG. 2A.

The brush seal subassembly 45 is retained by an inner diameter 50 of the retaining ring 48 in an interference relationship. An example manufacturing process used to secure the brush seal subassembly 45 to the retaining ring 48 to provide the brush seal assembly 28 is shown in FIGS. 3-6. The retaining ring 48 is machined to final dimensions prior to assembly using known inexpensive methods. In the example shown, the retaining ring 48 includes a chamfer 49 that cooperates with a chamfer 51 on the brush seal subassembly 45 to facilitate insertion of the brush seal subassembly 45 into the retaining ring 48. The retaining ring 48 is supported by a plate 52. The brush seal subassembly 45 is arranged on the retaining ring 48, as shown in FIG. 3. The brush seal subassembly 45 and retaining ring 48 are arranged beneath a plunger 58 that is axially movable in response to an input from an actuator 60 that is interconnected to the plunger 58. The brush seal subassembly 45 is press-fit into the retaining ring 48.

Figure 4:
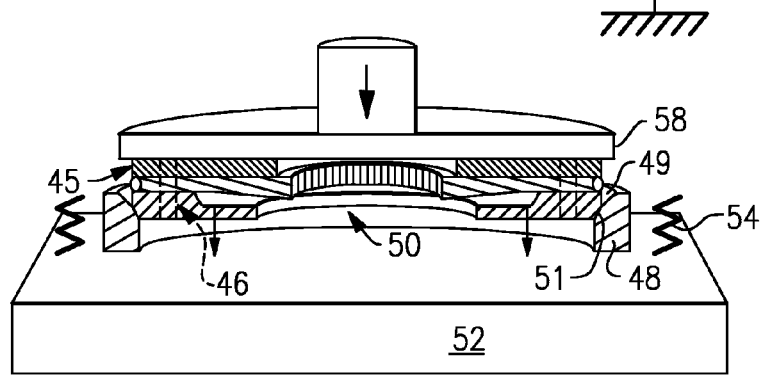
FIG. 4 is a schematic view of the retaining ring in a heated state.
Figure 5:
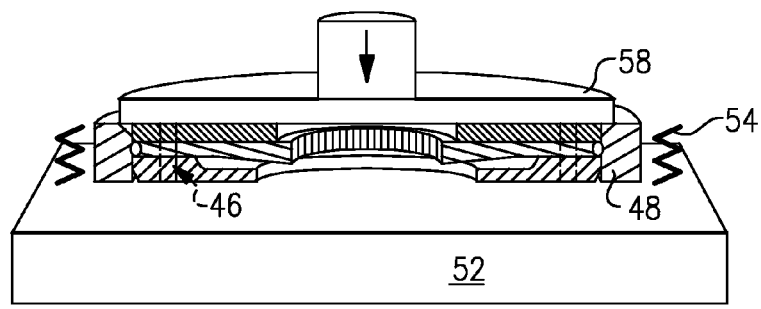
FIG. 5 is a schematic view of the brush seal subassembly pressed into the heated retaining ring.
Figure 6:
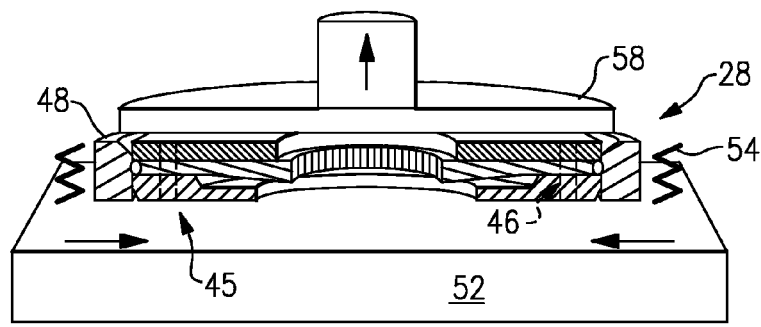
FIG. 6 is a schematic view of the brush seal assembly after heating and pressing.

In one example, the retaining ring 48 is heated to enlarge the inner diameter 50 so that the retaining ring 48 more easily accommodates the brush seal subassembly 45 during assembly. In one example, an induction heater 54 is arranged about the retaining ring 48. The induction heater 54 communicates with a source 56 to selectively heat the retaining ring 48 during assembly. As shown in FIG. 4, the induction heater 54 heats the retaining ring 48 before the plunger 58 presses the brush seal subassembly 45 into the retaining ring 48, which is shown in FIG. 5. Once the brush seal subassembly 45 has been pressed into the retaining ring 48, the plunger 58 is retracted (FIG. 6). The retaining ring 48 cools, providing a secure attachment between the brush seal subassembly 45 and the retaining ring 48.

The brush seal subassembly 45 can be removed from the retaining ring 48 by reversing the above method to replace a worn subassembly with a new subassembly.

Although example embodiments have been disclosed, a worker of ordinary skill in this art would recognize that certain modifications would come within the scope of the claims. For that reason, the following claims should be studied to determine their true scope and content.

What is claimed is:

1. A brush seal assembly comprising:

bristles arranged circumferentially about an axis, wherein the bristles include outer ends secured to one another with a perimeter weld bead;

first and second plates securing the bristles axially between them, the first and second plates including an outer periphery, the perimeter weld bead arranged radially inwardly of the outer periphery and not machined, the first and second plates unsecured to the bristles by the perimeter weld bead;

a retaining ring secured to the outer periphery of the first and second plates by an interference fit; and tack welds securing the first and second plates to one another about the bristles, wherein the retaining ring includes a chamfer on one face of the retaining ring and one of the first and second plates includes a chamfer on another face of one of the first and second plates, the faces arranged opposite one another in a post-pressed position and adjoining one another in a pre-pressed position.

* * * * *